Patented Oct. 1, 1940

2,216,450

UNITED STATES PATENT OFFICE 2,216,450

PROCESS FOR PRODUCING DIKETEN

Martin Mugdan and Johann Sixt, Munich, Germany, assignors to Consortium fur Elektrochemische Industrie, G. m. b. H., Munich, Bavaria, Germany, a corporation of Germany No Drawing. Application March 4, 1938, Serial No. 193,852. In Germany March 13, 1937

9 Claims. (Cl. 260—550)

This invention relates to the production of diketen and has for its object to provide an improved process for this purpose.

The production of diketen from pure keten involves considerable technical difficulties, due particularly to the fact that the polymerization occurs at serviceable speed only in the liquid phase while keten boils at ordinary pressure at $-41°$ C., a temperature at which polymerization occurs only very slowly. High pressure is nevertheless necessary to prevent boiling at the elevated temperatures at which the reaction proceeds more rapidly.

The point of greatest difficulty, however, is that reaction in the neighborhood of 0° C. is very turbulent, while primarily higher polymerization products are formed. (Journal Chemical Society, London, 93, I, page 946 (1908); 97, II, page 1934 (1910)). In another process acetone is used as solvent, and, while it is true that in this case the output is better, this is true only when definite and precise instructions are followed in connection with the adjustment of the temperature which must be increased gradually with increasing conversion. The diketen which is thus generated must finally be separated from the acetone.

We have found that the disadvantages of former processes are avoided and that diketen can be produced in rapid reaction and with a good output without the use of particularly low temperatures, higher pressures or special solvents, if solutions of keten in diketen are left to themselves while conducting away the reaction heat. In such case the keten polymerizes with surprising rapidity in the diketen solution. The essential point in the principle of operation of our process is therefore that the polymerization is effected from the very beginning in the presence of diketen.

In performing our process it is advisable to keep the keten content of the diketen solution in the vicinity of saturation by continuously supplying fresh keten, in order to maintain the maximum speed of transformation. For instance, an excess of keten is conducted through diketen, which is kept in a tall cylindrical vessel, while the temperature is kept, by cooling, at a point at which the speed of the diketen formation has the desired value, said speed being recognizable by the resulting temperature difference between the reaction liquid and the cooling medium. The process may also be performed without an excess of keten, for example by supplying the keten at the lower end of a tall cylindrical vessel which may be cooled, and which is filled with diketen, this vessel being subdivided into sections for the purpose of avoiding mixing, so that the saturated solution formed below may enter into the reaction on the top of the vessel. The diketen flows off continuously at the upper end of the vessel, at a velocity such that it leaves the vessel substantially free of keten. The diketen may also be treated with keten in a coolable stirring boiler. The keten is absorbed by the diketen in the proportion of its conversion into diketen. The conversion still gives a good output even at a temperature of 50° C. and over.

The diketen formation may be substantially accelerated with the use of elevated pressure which increases the saturation concentration of the keten. An addition of a small quantity of mineral acid or its acetyl compound to neutralize noxious base traces has been found effective.

Example 1

The keten was produced as disclosed in our U. S. Patent 2,108,829 by dissociation from acetic acid vapor under vacuum and then condensed by being cooled to a low temperature. It was thereupon evaporated at ordinary pressure and the steam was introduced in excess at the bottom of an elongated vessel of Jena glass, of cylindrical form, filled with 100 parts of diketen, the temperature of which was kept at $+25°$ C. by cooling. 15 parts of diketen were formed in the first hour, and the quantity increased proportionally in the subsequent hours. The keten flow was stopped after six hours and the fluid was allowed to stand another short period at 25° C. The small residue of keten which still remained at that time was evaporated into the vacuum chamber of the keten-producing appliance and the untreated diketen, of which altogether 205 grams were available, was distilled in vacuum at the temperature of the boiling water-bath. The remaining residue which consisted of polymerization products of higher molecular value amounted to 10% in proportion to the newly formed diketen.

Example 2

The operation was performed in substantially the same way as in Example 1. 1% acetyl-chloride was added to the diketen and the temperature maintained at $+50°$ C. There was a reflux cooler in the gas chamber of the glass cylinder. The original quantity of diketen—100 parts—increased in the course of an hour by about 8–9%. Impurities of 11% remained after vacuum-distilling the product, in proportion to the diketen which had been formed.

Example 3

100 parts of diketen were placed in a cylindrical coolable pressure vessel which consisted of the well-known iron alloy containing 18% chromium and 8% nickel. While maintaining a temperature of +10° C. and an overpressure of 1 atmosphere, liquid keten cooled to a low temperature was supplied from a pressure vessel in small portions at the bottom of the cylinder. About 50 parts of diketen were newly formed in one hour. The quantity of the by-products amounted to about 9% of the diketen yield.

It will be evident that various changes may be made in the details and methods of operation described above without departing from the scope and spirit of the invention as defined in the appended claims.

The invention claimed is:

1. Process for producing diketen from keten, which comprises introducing keten into substantially undiluted diketen and polymerizing the keten in the presence of the diketen while removing the reaction heat.

2. Process for producing diketen from keten, which comprises introducing keten into substantially undiluted diketen and polymerizing the keten in the presence of the diketen while maintaining the reaction mixture at a temperature of 0–50° C.

3. Process for producing diketen from keten, which comprises continuously introducing keten into substantially undiluted diketen at a pressure above atmospheric pressure while continuously removing the heat produced by the reaction.

4. Process for producing diketen from keten, which comprises continuously introducing keten into substantially undiluted diketen at a temperature of 10–50° C.

5. Process for producing diketen from keten, which comprises continuously introducing keten into diketen in an elongated reaction chamber at a temperature of 10–50° C. and at a velocity such as to cause the diketen to leave said chamber substantially free of keten.

6. Process for producing diketen from keten, which comprises introducing keten into substantially undiluted diketen and polymerizing the keten in the presence of the diketen at a pressure between about 1 and 2 atmospheres absolute while maintaining the reaction mixture at a temperature of 0° C. to 50° C.

7. Process for producing diketen from keten, which comprises continuously stirring substantially undiluted diketen with keten at a temperature above 0° C., and at a pressure between about 1 and 2 atmospheres absolute, while removing the heat produced by the reaction.

8. Process for producing diketen from keten which comprises continuously introducing keten into substantially undiluted diketen at a pressure above atmospheric but not substantially greater than 2 atmospheres absolute while continuously removing the heat produced by the reaction.

9. Process for producing diketen from keten which comprises continuously introducing substantially undiluted keten into diketen at a temperature of 10° C. to 50° C. and at a pressure between about 1 and 2 atmospheres absolute.

MARTIN MUGDAN.
JOHANN SIXT.